Dec. 4, 1951     G. W. OAKES     2,577,354
TRAP
Filed May 11, 1949
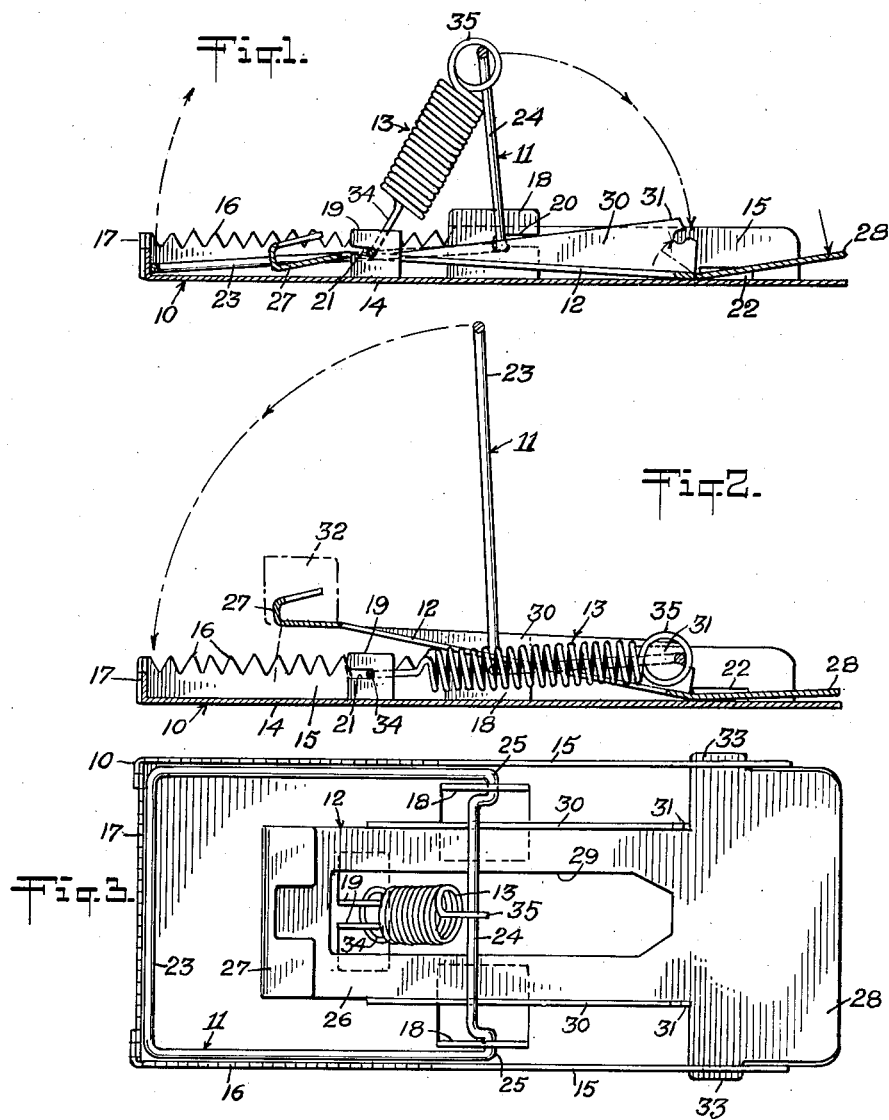
Inventor
George W. Oakes
By
Munn, Liddy & Glaccum
Attorneys Patented Dec. 4, 1951

2,577,354

UNITED STATES PATENT OFFICE 2,577,354

TRAP

George W. Oakes, Crystal City, Mo.

Application May 11, 1949, Serial No. 92,705

1 Claim. (Cl. 43—82)

This invention relates to a device for trapping small animals such as mice.

An object of the present invention is the provision of a trap of the indicated character which kills a trapped mouse, and by reason of novel features enables the dead mouse to be removed from the trap without touching the mouse, and also enables a person to set the trap easily and safely.

The present invention also resides in the efficient construction and effectual operation of the parts of the trap, and the economy with which the trap may be manufactured in large quantities.

The nature of the invention and its distinguishing features and advantages will appear when the following specification is read in conjunction with the accompanying drawing, in which:

Fig. 1 is a central longitudinal sectional view of a trap embodying the features of the present invention, the trap being shown sprung.

Fig. 2 is a view similar to Fig. 1 but showing the trap set.

Fig. 3 is a top plan view of the trap.

The trap comprises four parts 10, 11, 12 and 13.

The part 10 in the nature of a base consists of a plate 14 having an upstanding marginal flange 15 extending all around the plate except at the rear end. The flange 15 is serrated at the front end of the plate and partly around the sides to provide teeth on the flange constituting a fixed jaw 17. Pairs of lugs are upstruck from the plate 14, there being a pair of lugs 18 and a pair of lugs 19. The lugs 18 have notches 20 therein and the lugs 19 have notches 21 therein. By notching the lugs in the manner shown they serve as hooks. The flange 15 has slots 22 therein at opposite sides of the plate 14. The slots 22 are in transverse alinement with respect to the longitudinal axis of the plate 14.

The part 11 consists of a single piece of stout wire bent to provide a loop 23 and a trigger setting loop 24 in continuation of the loop 23, as a single element of L-shape. The loop 23 constitutes a jaw, and the loop 24 constitutes manipulatable means for setting the jaw 23. The wire is bent into offsets at the juncture of the loops to provide pivots 25 in axial alinement with each other. The pivots 25 are receivable in the notches 20 respectively thereby mounting the part or element 11 and therefore the loops 23 and 24 for pivotal movement with respect to the plate 14. By reason of the pivotal movement of the element 11, the jaw 23 is movable into an open and closed position with respect to the fixed jaw 17.

The part 12 is in the nature of a trigger and bait holder and is constructed from a single piece of sheet metal to provide an elongated portion 26, a rebent notched front end portion 27, and a relatively wide rear end portion 28. The portion 26 has an opening 29 therein and upstanding side flanges 30 with notches to provide projections 31. The portion 27 provides hooks or the like constituting bait holding means. Bait is indicated at 32 in Fig. 2. The portion 27 slants forwardly and downwardly with respect to the portion 26, and constitutes a trigger actuator. The portion 28 has lateral projections 33 receivable in the slots 22 to prevent endwise movement of the part 12 with respect to the plate 14 on which it rests. The portion 28 slants rearwardly and upwardly with respect to the portion 26 making it possible for the part 12 to rock on the plate 14 so that the projections 31 have a certain amount of arcuate movement as the part 12 is rocked on the plate 14. The slots 22 are large enough to allow the part 12 to rock without interference from the projections 31.

The part 13 consists of a contractile helical spring which has one end connected with the lugs 19, as at 34, and its opposite end connected with the loop 24, as at 35. The lugs 19 project upwardly through the opening 29. The spring 13 is placed under tension when the jaw 23 is in its open position and reacts forcefully to snap the jaw 23 into its closed position when released from its open position as indicated by the arrows in Fig. 2.

In order to set the trap when the parts are in the relation shown in Fig. 1, pressure is exerted on the loop 24 with the thumb of one hand while holding the base 10 in the other hand. The pressure on the loop 24 is exerted rearwardly and downwardly causing rearward and downward pivotal movement of the loop 24. As the loop 24 reaches a point below the projections 31, the thumb exerts a wiping pressure on the portions 28 of the trigger 12 causing the trigger to rock and the projections 31 to engage the loop 24, thereby releasably holding the jaw 23 in its open position as shown in Fig. 2. When the trap is set, the spring 13 is in tension on almost a dead center, which requires very little effort to hold or release the trigger. When a mouse nibbling on the bait exerts a slight downward pressure on the trigger 12, the trigger will rock and disengage the projections 31 from the loop 24. The spring 13 instantly causes the pivotal movement of the element 11 with the result that the jaw 23 is snapped into its closed position to grippingly cooperate with the jaw 17. In this manner a mouse becomes trapped and is killed.

The other objects and advantages will be obvious from the foregoing description. In this connection it is to be noted that after the parts of the trap are made they may be assembled without the use of tools.

I claim:

A trap comprising a base plate constructed of sheet material and having an upstanding flange serrated to provide a fixed jaw, said plate also having upstruck pairs of spaced lugs, there being a notch in each lug, an element made of stout wire which provides a loop jaw and a trigger engaging loop, said element engaged in the notches in one pair of lugs for moving said loop jaw and trigger engaging loop into an open position, and a closed position, a contractile spring having the opposite ends connected with the trigger loop and the other pair of said lugs causing closing movement of the loop jaw, said loop jaw in the closed position grippingly cooperating with the fixed jaw, a trigger constructed of sheet material and having hooks on one end to hold bait, an angular portion on the opposite end of the trigger constituting an actuator for rocking the trigger, lateral projections engaged at opposite sides of said base plate with said flange keeping the trigger from moving endwise with respect to the plate, and rear projections on the trigger to be engaged by said trigger loop upon opening movement of said trigger loop and by rocking the trigger with said actuator, thereby holding the loop jaw in the open position, subject to pressure exerted on the bait hooks of the trigger causing the release of the trigger loop from said rear projections and the movement of the loop jaw into the closed position.

GEORGE W. OAKES.

REFERENCES CITED

The following references are of record in the file of this patent:

UNITED STATES PATENTS

| Number | Name | Date |
|---|---|---|
| 580,694 | Hooker | Apr. 13, 1897 |
| 1,015,916 | Teel | Jan. 30, 1912 |
| 1,342,255 | Doust | June 1, 1920 |
| 1,992,294 | Eycleshymer | Feb. 26, 1935 |
| 2,068,865 | Neuhausen | Jan. 26, 1937 |
| 2,380,127 | Tomey | July 10, 1945 |

FOREIGN PATENTS

| Number | Country | Date |
|---|---|---|
| 539,289 | France | Mar. 31, 1922 |
| 800,395 | France | May 4, 1936 |
| 202,081 | Great Britain | Aug. 16, 1923 |